(12) United States Patent
Stoddard et al.

(10) Patent No.: US 6,697,681 B1
(45) Date of Patent: Feb. 24, 2004

(54) SHARED OPERATING UNIT FOR A NETWORK OF PROGRAMMABLE EQUIPMENT

(75) Inventors: Kenneth A. Stoddard, Rochester, MI (US); R. William Kneifel, II, Rochester Hills, MI (US); Jason A. Sattler, Rochester Hills, MI (US)

(73) Assignee: Trellis Software & Controls, Inc., Rochester Hills, MI (US)

( * ) Notice: Subject to any disclaimer, the term of this patent is extended or adjusted under 35 U.S.C. 154(b) by 0 days.

(21) Appl. No.: 09/532,393

(22) Filed: Mar. 22, 2000

(51) Int. Cl.⁷ .............................................. G05B 11/01
(52) U.S. Cl. ........................ 700/17; 700/83; 700/264; 700/84; 345/156; 345/174
(58) Field of Search ...................... 700/11, 247–249, 700/264, 9, 2–4, 17, 19, 20, 83, 159, 169, 85, 65; 340/3.1, 3.9, 825.22, 825.23; 345/156, 174

(56) References Cited

U.S. PATENT DOCUMENTS

| | | | | |
|---|---|---|---|---|
| 4,520,274 A | | 5/1985 | Stants ........................ 307/39 |
| 4,641,269 A | * | 2/1987 | Japenga et al. ............. 700/158 |
| 4,760,393 A | * | 7/1988 | Mauch ...................... 340/5.54 |
| 5,041,070 A | | 8/1991 | Blaser ........................ 493/14 |
| 5,224,051 A | * | 6/1993 | Johnson ..................... 700/169 |
| 5,249,140 A | * | 9/1993 | Kessler .......................... 700/3 |
| 5,437,044 A | * | 7/1995 | Hohner et al. ................ 710/72 |
| 5,796,607 A | * | 8/1998 | Le Van Suu .................. 700/11 |
| 5,805,442 A | * | 9/1998 | Crater et al. .................... 700/9 |
| 5,973,481 A | | 10/1999 | Thompson et al. ............. 322/7 |
| RE36,631 E | * | 3/2000 | Tanabe et al. ........ 318/568.13 |
| 6,175,780 B1 | * | 1/2001 | Engel .......................... 700/293 |
| 6,292,712 B1 | * | 9/2001 | Bullen ........................ 700/245 |
| 6,411,856 B1 | * | 6/2002 | Takeuchi et al. ............... 700/3 |
| 2002/0045970 A1 | * | 4/2002 | Krause et al. ............... 700/264 |

OTHER PUBLICATIONS

Sankyo SC3000 Robot Controller Product Description, www. sankyo.com/robots/controls.html, dated Dec. 10, 1999 (1 Page).

Concept Kitchen Fingertip Stylus Product Description, www.smaller.com/product.cfm?id=100060&, dated Feb. 23, 2000 (2 Pages).

* cited by examiner

*Primary Examiner*—Paul P. Gordon
*Assistant Examiner*—Crystal J. Barnes
(74) *Attorney, Agent, or Firm*—Harness, Dickey & Pierce, P.L.C.

(57) ABSTRACT

A device on a network having multiple units of programmable industrial equipment includes a control handle connected to a controller for a unit of the programmable equipment and a shared operating unit selectively connected to the control handle for controlling the unit of programmable industrial equipment through the controller. Further, the shared operating unit is adapted to connect to the network for communicating with each unit of programmable equipment on the network.

60 Claims, 3 Drawing Sheets

SHARED OPERATING UNIT FOR A NETWORK OF PROGRAMMABLE EQUIPMENT

BACKGROUND OF THE INVENTION

The present invention relates to a network of programmable equipment, and, more particularly, to a shared operating unit for use with multiple controllers on the network of programmable equipment.

For industrial equipment, particularly robots, pendants have been used to facilitate manual motion, teaching, maintenance and testing programs. The development of the pendant is a product of a historical need to "teach" movement to the robot, as opposed to numerically programmed machine tools wherein movement was programmed from blueprints. For robots, the data was too complex to be expressed in blueprints because the movement data involved the relationship between parts, between a part and a fixture, and between fixtures. While cell layout by computer and accurate interprocess motion definition through off-line programming is a relatively recent development, the first robot had to be programmed by showing it the specific intracell relationships. Towards this end, the pendant was developed for directing manual motion of the machine, and recording and modifying the motion data so that the machine could be used as a measuring device. Further, the pendant was a source of program generation and test playback for the machine motion. Over time, the pendant also became a source for many maintenance-related operations.

Using a pendant to direct manual motion of a robot is akin to the handwheel that has been used to manually move machine tools around. For pendants, buttons and joy sticks have evolved as the basic manual motion control mechanism. Further, the ability to manually move machines is not simply a teaching feature, but also a safety and recovery feature. That is, manual motion is employed to bring machines to safe positions during start up and maintenance operations and to recover from program failures. Further, the use of a pendant for recording or modifying movement data for subsequent playback permits the robot to be used as a measuring device. This sort of teaching function evolved as an accurate way to get the robot to a particular point in space and then record where the robot "thinks" it is.

Because of a need to be near the robot in order to visually verify the correct operation of the process being facilitated by the robot, program testing is quite often done at the pendant. This has resulted in the evolution of teach-pendant-based languages that span nearly all application requirements, such that most functions can be done from the pendant. As a result of the heavy reliance on the pendant for most robot-related functions, most maintenance-related operations and set-up operations similarly occur at the pendant to avoid the use of a second interface. Although theoretically these functions could be done elsewhere, such as at the operation control panel for each robot, historically these functions have been incorporated into the pendant. Accordingly, as more and more functionality has been added to the pendant, the cost to manufacture it increased significantly.

As a result of the evolution of pendants, a typical network of programmable equipment including robots has a pendant for each robot, and many include an operator control panel in addition to the pendant. The pendant is used for the manual motion, teaching, programming and maintenance functions discussed above. The pendant is usually tethered to a controller for the particular piece of programmable equipment. Because the pendant is a high cost item, a simple way to reduce costs would be to eliminate the pendant. But given the background of pendant evolution, and the reliance on the pendant for manual motion, teaching, programming, and maintenance functions, elimination is not realistic. Accordingly, it is desired to provide the use of a pendant for each piece of programmable equipment, such that any of the traditionally relied on pendant functions may be employed, while reducing overall costs.

SUMMARY OF THE INVENTION

Sharing an operating unit, or a plurality of operating units, each having pendant functions, among a network of programmable equipment including robots overcomes the limitations of the prior art and helps reduce overall cost by providing more efficient use of the "pendant," or shared operating unit. Further, by providing advanced functionality in the shared operating unit and a control handle to which it is selectively coupled, the functions of the operator control panel can be replicated, therefore rendering the conventional operator control panel extraneous.

In a network of programmable equipment including robots, wherein each piece of programmable equipment includes its own controller, the shared operating unit selectively couples to the control handle, which itself is coupled to a particular controller to provide communication between the shared operating unit and the controller. When the shared operating unit is connected to the control handle, the operating unit is able to provide conventional pendant functions for the particular piece of programmable equipment through the controller. Further, the control handle itself includes at least some minimal functionality operable when the shared operating unit is not coupled to it. Optionally, between the control handle and shared operating unit, all of the operator control panel functions are provided. Moreover, additional functionality can be provided in the shared operating unit, adapting it for stand-alone use and network communication, whereby programming, testing, and monitoring of any networked industrial equipment can be accomplished from a remote network location.

In a version of the invention, for safety and practicality, when connected to the control handle, the shared operating unit is able to provide certain functions that it is not able to provide when unconnected. Further, the control handle can be either physically connected or wirelessly connected to a particular controller and/or a network hub. Where physically connected, the communication is preferably via a serial bus. Where the connection is wireless, a wireless application protocol is preferred.

BRIEF DESCRIPTION OF THE DRAWINGS

FIG. 4 is a perspective view of a fingertip stylus for use with the shared operating unit according to the invention;

DETAILED DESCRIPTION OF THE PREFERRED EMBODIMENTS

Figure 1:
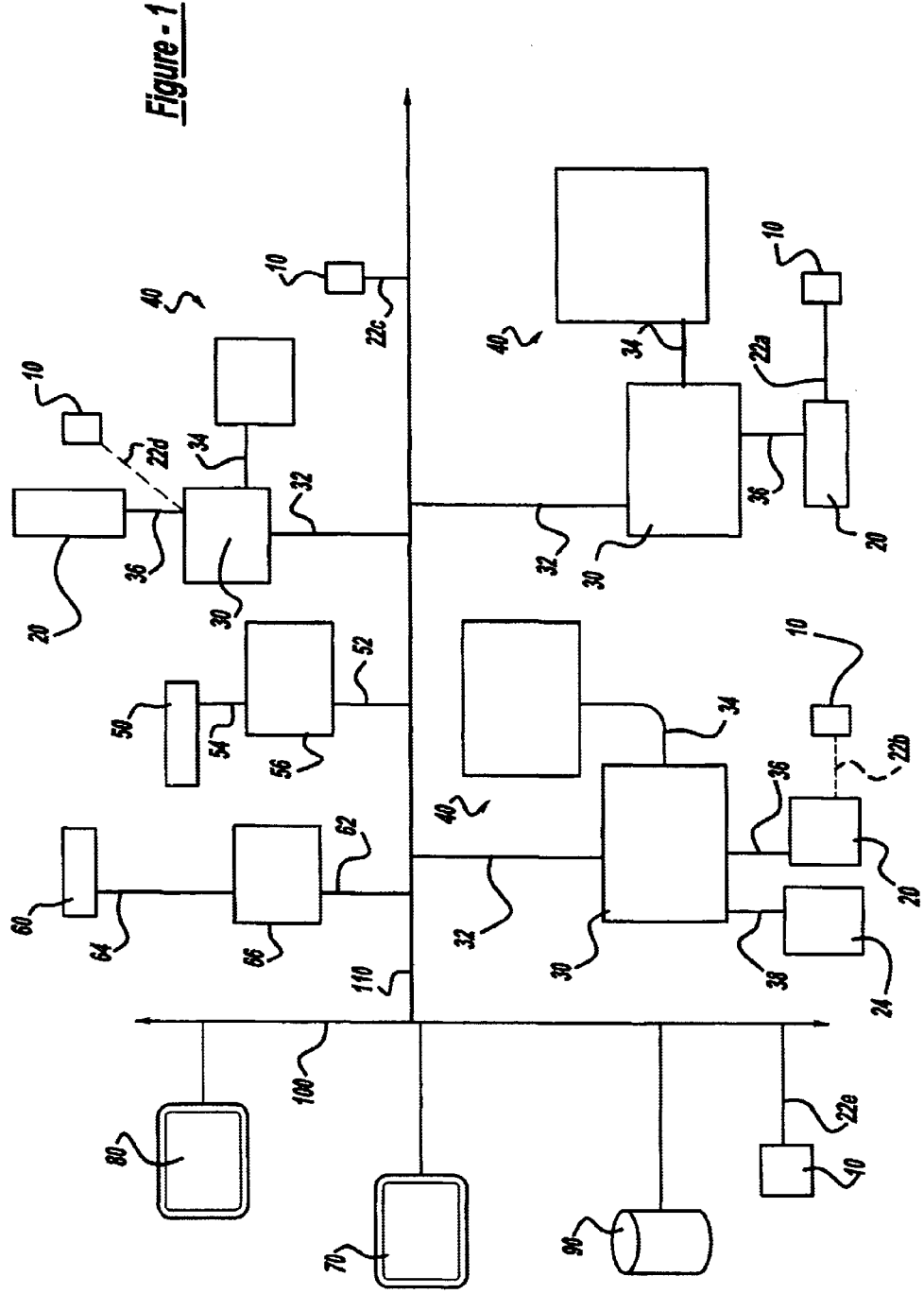
FIG. 1 is a schematic illustrating a shared operating unit for use with multiple controllers of a network of programmable equipment.

A network of programmable equipment including robots 40 is shown schematically in FIG. 1. According to the invention, each robot 40 includes a control handle 20 coupled thereto. Each control handle 20 is coupled to a robot controller 30 and adapted to be selectively coupled to a shared operating unit 10. The shared operating unit 10 is able to communicate with the particular robot 40 to which it is coupled through the control handle 20, and with each networked robot 40 through any robot controller 30, or through a remote network connection, or wirelessly. While FIG. 1 shows multiple shared operating units 10, preferably only one shared operating unit 10 is provided for each cell of networked programmable equipment. The multiple shared operating units 10 of FIG. 1 are for illustrative purposes only, although a particular network cell may have more than one shared operating unit 10 in accordance with the invention.

The network of programmable equipment is preferably a network of robots 40. Each robot 40 is connected to a controller 30, which sends control signals to the robot 40 in accordance with a set of program instructions. The controller 30 is preferably a computer having a high capacity central processing unit, and both random access and disk memory for storing programmed instructions and data. Further, the controller 30 may be coupled to a control panel or operator's console 24, which conventionally includes a keyboard, display, and an interface for communicating with the robot or any other controller or computer on the network. A version of the invention eliminates the operator control panel 24 by including those functions in the control handle 20 and shared operating unit 10.

The network of programmable equipment includes one or more cell networks 110 connected to an enterprise network 100. The enterprise network 100 includes a server 90, and may provide remote access to a remote workstation 80. Further, the shared operating unit 10 is adapted to connect to the cell network 110 and enterprise network 100, either physically or Tirelessly. A cell controller 70 ensures integration of data between each machine, robot, automatic guided vehicle, etc., of the cell network 110. In the cell network 110, communication is possible between each controller of the network and between different networks. The cell controller 70 serves to perform such tasks as downloading part and application programs from a CAD system to particular equipment in the cell, monitoring actual performance of each piece of equipment, comparing the performance to a plan, selecting ultimate routing for a part if particular equipment is not operable, notifying operators of pending out-of-tolerance conditions, archiving historical performance of the cell, and transmitting on the enterprise network 100 the cell performance compared to the plan.

Each unit of programmable industrial equipment on the cell network 110 is connected to the cell network 110. As shown in FIG. 1, a programmable logic controller 66 for controlling programmable industrial equipment 60 is connected to the cell network 110 via communication bus 62. Similarly, computational numeric controller 56 for controlling programmable industrial equipment 50 is connected to the cell network 110 via communication bus 52. Industrial equipment 50, 60 is connected to its respective controller 56, 66 via a communication bus 54, 64, respectively. In a similar manner, for each robot 40, its controller 30 is connected to the cell network 110 via a communication bus 32. Further, a communication bus 36 couples the control handle 20 or a communication to its controller 30. Where an operator control panel 24 is used, a second communication bus 38 couples the operator control panel 24 to its respective controller 30. Each controller 30 is coupled via a connection 34 to its robot 40 to provide control signals to the robot 40.

The shared operating unit 10 is adapted to connect to the cell network 110 and the enterprise network 100 directly or indirectly. The shared operating unit 10 is further adapted to communicate with any control handle 20 through a physical communication link 22a or a wireless communication link 22b. Preferably, a docking port 130 (see FIG. 2) on the control handle 20 supports the shared operating unit 10 for facilitating a physical connection. Further, the shared operating unit 10 is adapted to be coupled through a wireless communication link 22d to any controller 30, 56, 66. When coupling to a controller 30, 56, 66, the shared operating unit 10 can be physically connected directly to the particular controller, but it is preferred for practical reasons that any physical connection of the shared operating unit 10 to a controller be accomplished indirectly through the controller's control handle 20. For controllers 56, 66, however, a physical communication link may be preferred. The shared operating unit 10 is further adapted to either wirelessly or physically couple directly to the cell network 110 or enterprise network 100 through communication links 22c, 22e. Through this network communication flexibility, the shared operating unit 10 provides the user with efficient programming, monitoring, maintenance, and teaching functions.

The connection between the control handle 20 and the shared operating unit 10 can be physical or wireless. Preferably, the connection indicates a unique association between the shared operating unit 10 and the particular controller 20 to which it is connected, thereby allowing certain shared operating unit functions that are not possible in the absence of the connection. Where a physical connection is employed, a cable 36 connecting the control handle 20 to the controller 30 provides power for the control handle 20 and the shared operating unit 10 when it is coupled to the control handle 20. When the shared operating unit 10 is detached, rechargeable batteries are the preferred power source. Further, the cable 36 includes pass-through wiring for directly coupling the shared operating unit 10 to the controller 30, and thus the network of programmable equipment, when it is coupled to the control handle 20. The cable 36 further includes live-man wiring and emergency-stop wiring.

Figures 2, 3:
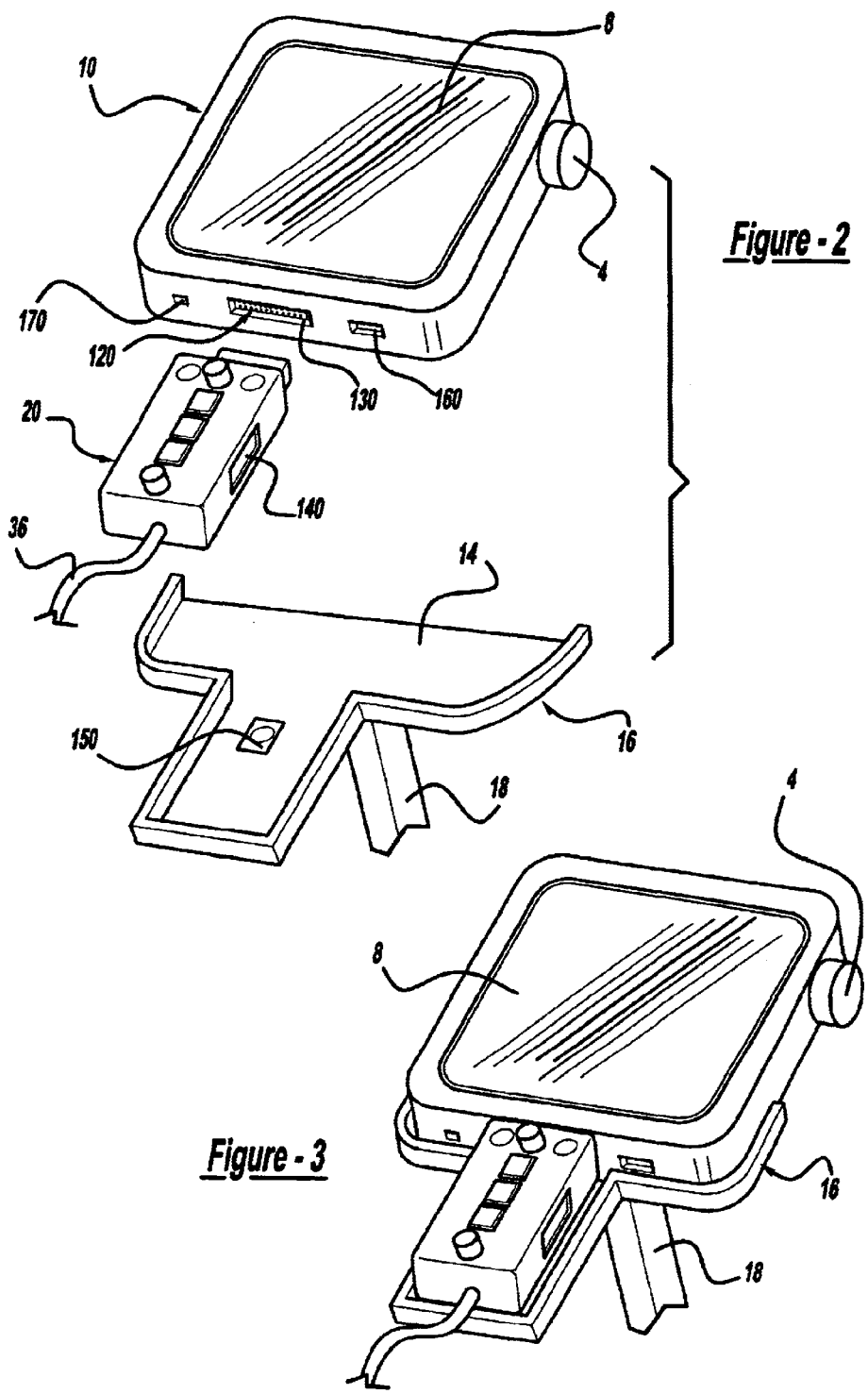
FIG. 2 is an exploded view of the control handle, cradle, and shared operating unit according to the invention.
FIG. 3 is a perspective view of a coupled control handle, cradle, and shared operating unit according to the invention.

The control handle 20 is preferably physically tethered to the controller 30 by the cable 36 to keep the control handle 20 in proximity to the robot 40, but allow the user to walk around and observe the robot 40 while using the control handle 20. As shown in FIG. 2, the control handle 20 includes an interface 120 for communicating with the shared operating unit 10. Preferably, the interface 120 provides a unique association between the shared operating unit 10 and the particular controller 30 to which the control handle 20 is connected. The unique association may be provided by directly connecting to the particular controller. Preferably the control handle 20 also includes a docking port 130 for supporting the shared operating unit 10 in addition to providing a communication link. Together, the control handle 20 and shared operating unit 10 provide all conventional pendant functions. Further, the shared operating unit 10 provides additional functionality, flexibility, and efficiency for programming, monitoring, and maintaining robots and networks of programmable equipment.

The control handle 20 preferably includes all essential control panel functions such as controller HOLD, START, and CLEAR FAULT. Further, the control handle 20 preferably includes standard control panel indicators such as HELD, RUNNING, and FAULT. The indicators can be back-lights or LEDs. If LEDs are used, it is possible to incorporate them into buttons for associated control panel functions. The control handle 20 should also include an emergency stop function, preferably actuable by a button on the control handle 20. Moreover, the control handle 20 should include enable switches 140, preferably on each side thereof.

Figure 4:
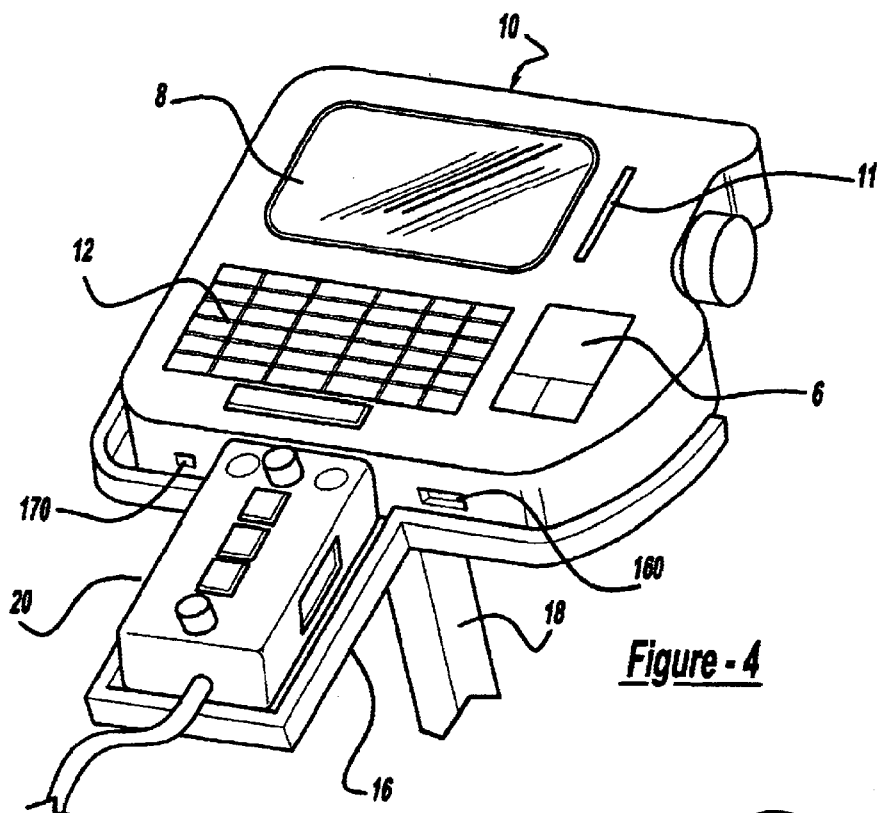
FIG. 4 is a perspective view of an alternative embodiment of a coupled control handle, cradle and shared operating unit according to the invention.

As shown in FIGS. 2 through 4, a cradle 16 serves as a base for the control handle 20 and the shared operating unit 10, and positions the control handle 20 and the shared operating unit 10 outside the working volume of the robot 40. The cradle 16 preferably includes a post or pedestal 18 for mounting the cradle 16. As illustrated, the cradle 16 includes a well 14 for seating the control handle 20 and the shared operating unit 10. The cradle 16, however, can be provided in many other forms, with the important features being positioning the control handle 20 and the shared operating unit 10 outside the working volume of the robot 40 and supporting the control handle 20 and shared operating unit 10, thereby facilitating safe use of those devices by an operator. The cradle 16 preferably includes a presence switch 150 to signal to the attached controller 30 that the control handle 20 is seated in the well 14 of the cradle 16, thereby enabling such normal operating panel functions as START. When the coupled control handle 20 and shared operating unit 10 are removed from the cradle 16, they remain tethered to the controller 30 via cable 36 and are adapted for use as a full-function pendant. Further, when the control handle 20 and shared operating unit 10 are de-coupled, the control handle 20 provides certain local functions and the shared operating unit 10 provides certain local and global functions, as will be explained below.

As shown in FIGS. 2 through 4, the shared operating unit 10 is preferably a handheld or portable device having a graphical user interface, memory, and a processor. The shared operating unit 10 may include any of several input means such as a keyboard 12, stylus 11, and touchpad 6, especially for replicating control panel testing and programming functions, and a display means 8. Further, the display means 8 may be a touch screen, which is beneficial for inputting data and selections. The shared operating unit 10 preferably includes a PCMCIA slot 160 to provide interface flexibility, such as for backing up application programs. Also, the shared operating unit 10 preferably includes an infrared port 170 to provide wireless communication between the shared operating unit 10 and another device, such as a wireless keyboard. To provide wireless communication with any device on the network 100 or network cell 110, the shared operating unit 10 preferably includes a radio frequency communication mechanism.

The shared operating unit 10 runs an operating system supporting browser capability, and preferably runs Microsoft Windows CE® operating system. Other operating systems, such as Palm OS, Linux, etc., are also possible. Many utilities are presently written to run on Microsoft Windows CE®. Thus, providing the Microsoft Windows CE® operating system on the shared operating unit 10 allows the operator to use the shared operating unit 10 in conjunction with third party utilities to provide a complete application support package. Significantly, installing and running the utilities on the shared operating unit 10 lowers overall costs by reducing licensing fees, software maintenance, and upgrade costs, as compared to running the utilities on each controller and/or pendant in a conventional system, and increases efficiency and overall convenience. For example, a single maintenance technician provides support to an entire manufacturing plant with one copy of a third-party utility installed on a shared operating unit 10. Alternatively, the shared operating unit 10 runs a browser, and a server on the network cell hosts applications for the shared operating unit. In this manner, the shared operating unit 10 is further simplified and the network is efficiently maintained.

Certain functions of the shared operating unit 10 are more appropriately performed when the shared operating unit 10 is uniquely associated with a particular controller, and preferably connected to the control handle 20, while other functions are properly performed without such a unique association or a connection. The functions requiring a unique association-called "tethered" functions-are those local functions that are more appropriately used in conjunction with the emergency stop button, or those functions that require availability of an emergency stop button for safe use of the function. "Untethered" functions are those global functions performed by the shared operating unit that might otherwise be safely done on any networked computer or any other terminal device within the work cell. For example, manual motion using manual motion keys requires the availability of an EMERGENCY STOP BUTTON. Compare, however, reading through a program listing or monitoring digital input/output values, neither of which require any special safety considerations and, therefore, can be performed by an untethered shared operating unit. Further, certain functions are more appropriately performed with controller permission, which requires a unique association with a particular controller, but not necessarily a connection with the control handle 20 nor use in conjunction with an emergency stop button.

Generally, a tethered function is function requiring an accessible emergency stop button. The emergency stop button may be nearby, present on the shared operating unit, or present on the operator control panel associated with the function to be performed. The emergency stop function itself is not a tethered function, but its presence enables tethered functions to be utilized. For example, the control handle preferably includes an emergency stop button, so that when the shared operating unit is attached to it, tethered functions on either of the control handle or the shared operating unit are enabled.

The functions of the control handle are not all tethered functions, and not all tethered functions are included on the control handle. Functions such as START, STOP, and MANUAL MOTION are preferably included on the control handle, and are also considered tethered functions, but tethered functions also include PROGRAM START, PROGRAM STEP, and preferably FORCE INPUT/OUTPUT. Further, EMERGENCY STOP and ENABLE are also preferably on the control handle, but are not considered tethered functions. Further, functions requiring controller permission are not necessarily tethered functions. For example, editing a program does not require the presence of an EMERGENCY STOP button, but does require the permission of a controller; i.e., the controller cannot be in automatic mode.

MANUAL MOTION, in a preferred embodiment, is provided by the control handle, but can alternatively or additionally be provided on the shared operating unit. PRO- GRAM START is preferably provided on the control handle, and allows program initiation in a test mode. PROGRAM STEP provides single step operation for debugging the program, and is preferably initiated by the PROGRAM START button on the control handle. Alternatively, this tethered function can be initiated by a separate button on the shared operating unit. FORCE INPUT/OUTPUT is preferably a tethered function, but may alternatively be a function requiring only controller permission, depending on implementation.

In sum, there are three categories of shared operating unit functions: (1) functions requiring no permission or tethering; (2) functions requiring controller permission; and (3) functions requiring tethering. Examples of functions requiring no permission or tethering, called non-tethered functions, include monitoring the performance of a controller 30 and/or a robot, watching variables and digital input-output values, and checking the status of a robot 40 and/or controller 30. Functions requiring controller permission include modifying programs. Functions requiring tethering include manual motion, forcing inputs and outputs, and starting and stepping programs during testing or debugging.

The preferred embodiment of shared operating unit 10 is a portable graphical user interface having the functionality of a portable computer with the convenience of pendant functions. The shared operating unit 10 selectively couples to the control handle 20 via the interface 120. Preferably, the control handle 20 includes a minimal number of functions to support manual motion, such as speed, override, and jog mode select; a three-position enable switch; and EMERGENCY STOP, START, STOP, and CLEAR-FAULT functions. When attached to the control handle 20, the shared operating unit 10 communicates cell-network-wide or even enterprise-network-wide to multiple controllers and/or to any other device on the network, similar to a networked personal computer or terminal device. Further, the shared operating unit 10 functions as a pendant and, in at least one embodiment, is physically connected to the control handle 20. The shared operating unit 10 preferably runs Microsoft Windows CE® applications and can run thick or thin client applications depending on the need of the user. Further, the shared operating unit 10 preferably supports multiple windows or frames to monitor and support multiple controllers 30. When the shared operating unit 10 is detached from the control handle 20, it is capable of communicating with the cell network 110 or the enterprise network via physical communication means, such as an ethernet network card, or a wireless communication means, such as an infrared or radio-frequency link. In this case, only untethered functions can be performed.

The shared operating unit 10 may include several input devices, such as a keyboard 12, stylus 11, six-axis joystick 4, touch pad 6, and/or touch screen 8, as illustrated in FIG. 4. In a preferred version of the shared operating unit illustrated in FIGS. 2 and 3, only limited input devices are provided on the shared operating unit 10, such as a touch screen 8. A wireless keyboard (not shown) for communication with the shared operating unit 10 can alternatively be provided for character-intensive inputting, such as programming. The touch screen 8 is particularly useful for maintenance and setup operations and may be used to provide manual motion functions on the shared operating unit through touch screen icons.

A preferred input device for the shared operating unit 10 is a fingertip stylus 100 for use with the touch screen 8. In this way, the user can hold the shared operating unit 10 with one arm and touch the screen 8 with a finger on the other hand. The fingertip stylus 100 is preferably used with the index finger, but can be adapted for use with any finger. The preferred stylus includes a sheath 102 overlying the finger, with a low-profile protuberance 106 disposed extending from the sheath generally transverse to the pad of the finger. The low-profile protuberance 106 does not prevent the user from using the finger for other tasks, nor present any safety issues by extending laterally from the finger, which would increase the risk of snagging or bumping objects unintentionally. The protuberance 106 is preferably disposed under the distal finger pad where touch pressure is typically applied when using the finger to touch a touch screen 8.

Figure 5:
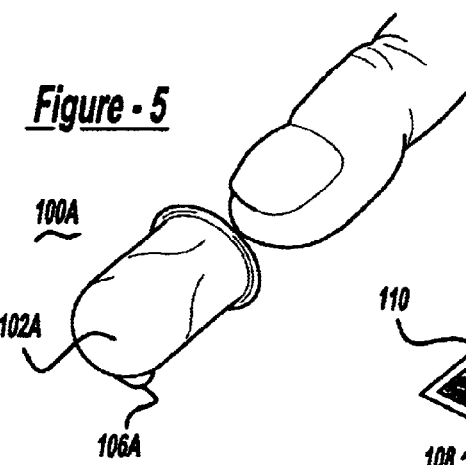

A fingertip stylus 100A according to the invention, as shown in FIG. 5, includes a sheath 102A comprising an elastic sleeve defining an open interior and a protuberance 106A extending outwardly from the sheath. For example, the sheath 102A may include latex, such as natural or synthetic rubber. The sheath 102A is placed over the finger by rolling the sleeve over the tip of the finger, preferably past the first knuckle, and positioning the protuberance 106A below the distal finger pad.

Figure 6:
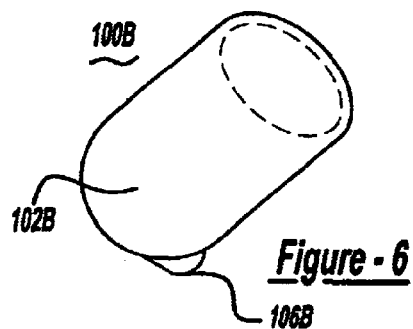
FIG. 6 is a perspective view of another version of the fingertip stylus for use with the shared operating unit according to the invention.

Alternatively, a fingertip stylus 100B according to the invention as shown in FIG. 6, is a more rigid sheath 102B defining an open interior contoured to the shape of the fingertip and including a protuberance 106B below the finger pad. For example, the sheath 102B may include metal or plastic. The sheath 102B is positioned on the finger by sliding the fingertip in the open interior of the sheath 102B and disposing the protuberance 106B below the distal finger pad.

Figure 7:
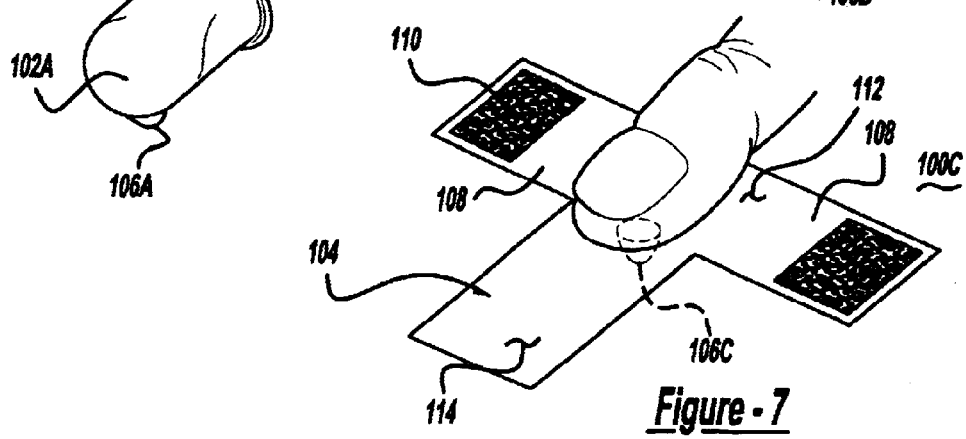
FIG. 7 is a perspective view of a yet another fingertip stylus for use with the shared operating unit according to the invention.

Another fingertip stylus 100C according to the invention, as shown in FIG. 7, is a T-shaped flexible body 104 including wings 108 and a protuberance 106C on an outer surface. The wings 108 preferably include an adhesive surface 110 for securing the stylus 100C on the finger. The body 104 may be any flexible material including fabric, paper, or even plastic. The fingertip stylus 100C is used by disposing a first portion 112 of the body below the distal pad of the fingertip, particularly disposing the protuberance 106C below the finger pad, and wrapping a second portion 114 of the body over the distal end of the finger and above the nail of the finger. The wings 104 are wrapped around the sides of the finger to secure the first portion 112 of the body to the second portion 114.

In a variation of this embodiment, the adhesive surfaces would include a removable cover, and a user would apply the stylus to the finger by removing the cover before applying the adhesive surfaces 110. In another variation of stylus 100C, the T-shaped flexible body 104 and wings 108 are a deformable material, such as aluminum or copper. The wings 104 are deformed to pinch the finger between the first and second portions of the body, thereby disposing the protuberance 106C below the distal finger pad for proper use.

In a version of the invention, the control handle 20 is used as a low cost operator panel including limited functions, such as START, STOP, and EMERGENCY STOP. Further, the control handle 20 may include several LEDs to indicate function status. Also, the control handle 20 preferably includes a mode switch, which alternatively may be on a controller cabinet. Further, the control handle 20 may be used as a support device for manual motion by including a six-axis joystick, which is a multiple degree of freedom motion control mechanism. Where the shared operating unit 10 is attached to the control handle 20, it provides all conventional pendant functions, and/or control panel functions with a graphical user interface. Because there is one control handle 20 per controller 30, manual motion capability is preferably available regardless of the availability of the shared operating unit 10. Optionally, manual motion functions could be eliminated from the control handle 20.

If it is preferred to include an operator control panel 24 for each robot 40, the shared operating unit 10 and control handle 20 according to the invention allow for the operator control panel 24 to be greatly simplified, thereby resulting in lower overall cost for the network of programmable equipment.

Much flexibility is available in sharing functions among the operator control panel 24, shared operating unit 10, and control handle 20. Essentially, because any function associated with robot control can be provided on the shared operating unit 10, which is shared among the networked industrial equipment, the need to include that function at each piece of industrial equipment is eliminated. Therefore, the operator control panel 24 could be simplified to include merely one or two basic functions, such as START, STOP, or EMERGENCY STOP.

Similarly, because of the ability of the shared operating unit 10 to include any robot control function, the control handle 20 may be simplified to include merely an emergency stop function. All other robot control functions, including tethered, untethered, and controller permission functions, could be included on the shared operating unit 10.

When the shared operating unit 10 is coupled to the control handle 20, and thus the controller 30 through the pendant bus 36, it dynamically determines the controllers 30 on the network with which it can communicate. Preferably, the shared operating unit 10 interrogates a shared database for self-configuration. As controllers 30 are added or deleted from the cell network 110, the shared operating unit 10 is preferably updated through polling or event notification. The shared operating unit 10 is able to select any registered controller 30, and the available functions depend on the type of connection with the particular controller 30. For example, for the controller 30 it is physically connected to, tethered functions are available, while for all other controllers 30, only untethered functions are available.

When sharing the operating unit 10 with multiple controllers 30, the operator must be able to determine, for each and every function, which controller 30 is affected by the function. For most functions, a controller selection process will make this obvious, as the operator will be able to see which controller is selected before invoking the function. For emergency functions, however, there can be no selection process. For this reason, there is preferably only one emergency function, the emergency stop function, which operates cell-wide. wide. All emergency stop buttons in a cell stop every robot 40 in the cell by cross-connecting connecting the stops or by using an external stop circuit. For all other functions invoked by the shared operating unit 10, a controller selection step determines that a particular function applies to a selected controller 30. Accordingly, function ambiguity from a shared operating unit 10 is resolved by defining cell-wide and selected controller functions. Further, the concept of cell-wide implies that the operation of the shared operating unit 10 is restricted to the cell. In cases where a pendant bus is used, the pendant bus is easily confined to the cell. But if a wireless device is used, the control handle 20 ensures the unique association between the tethered function, such as manual motion and program stepping, and a particular controller 30 (and thus to a particular cell).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device on a network having multiple units of programmable equipment, comprising:

a control handle connected to a programmable controller for a unit of said programmable equipment; and a shared operating unit selectively connected to said control handle for controlling said unit of said programmable equipment through said controller and adapted to connect to the network for communicating with each unit of programmable equipments;

wherein said control handle indicates to said shared operating unit a unique association with said controller connected to said control handle.

2. An apparatus comprising:

a control handle connected to a programmable controller for a unit of programmable equipment; and a shared operating unit controlling said unit of programmable equipment through a unique association with said controller by selective connection to said control handle, said shared operating unit being adapted to connect to a communication network.

3. The device of claim 2 wherein said control handle provides an emergency stop function.

4. The device of claim 3 wherein said control handle provides manual motion control of said programmable equipment.

5. The device of claim 4 wherein said manual motion control is provided by a jog button.

6. The device of claim 4 wherein said manual motion function is provided by a multiple degree of freedom motion control mechanism.

7. The device of claim 4 wherein said control handle includes an enable switch.

8. The device of claim 2 wherein said shared operating unit selectively provides tethered functions and non-tethered functions, said tethered functions only being available in conjunction with an emergency stop function.

9. The device of claim 8 wherein said tethered functions include manual motion control of said unit of programmable industrial equipment connected to said control handle.

10. The device of claim 9 wherein said manual motion control is provided by a touch screen on said shared operating unit.

11. The device of claim 8 wherein said tethered functions include program start in a test mode.

12. The device of claim 8 wherein said tethered functions include program step in a test mode.

13. The device of claim 8 wherein said non-tethered functions include monitoring any said controller and any said unit of programmable equipment connected to the network.

14. The device of claim 2 wherein said shared operating unit selectively provides controller permission functions when permission is granted by said controller.

15. The device of claim 14 wherein said controller permission functions include programming said unit of programmable industrial equipment connected to said controller.

16. The device of claim 2 wherein said shared operating unit is physically connected to said control handle.

17. The device of claim 2 wherein said shared operating unit is wirelessly connected to said control handle.

18. The device of claim 2 wherein said shared operating unit is physically connected to the network.

19. The device of claim 2 wherein said shared operating unit is wirelessly connected to the network.

20. The device of claim 2 wherein said shared operating unit includes a touch screen, and further comprising a fingertip stylus for use with said touch screen.

21. The apparatus of claim 2 wherein said shared operating unit is operable to communicate with multiple units of programmable equipment through said network.

22. The apparatus of claim 2 wherein said control handle provides a unique association with said controller connected to said control handle.

23. The apparatus of claim 22 wherein said control handle communicates to said shared operating unit said unique association.

24. A robot-control system, comprising:
multiple units of programmable industrial equipment, each unit of programmable industrial equipment including a programmable controller;
a control handle connected to each controller, wherein said control handle indicates to said shared operating unit a unique association with said controller connected to said control handle; and
a shared operating unit selectively connected to one of said control handles, said shared operating unit controlling said programmable industrial equipment through said controller connected to said control handle and adapted to communicate each controller of the network.

25. A method for operating a network of programmable industrial equipment comprising:
sharing an operating unit among said programmable industrial equipment;
providing a control handle for each unit of industrial equipment, said control handle adapted to connect to said operating unit;
controlling one unit of said programmable industrial equipment by connecting said operating unit to said control handle associated with said one unit of said programmable industrial equipment; and
uniquely associating said shared operating unit with said unit of programmable equipment.

26. The method according to claim 25 wherein said step of uniquely associating said shared operating unit with said unit of programmable equipment includes providing said shared operating unit with tethered functions for control of said unit of programmable industrial equipment.

27. A method for operating a network of programmable industrial equipment, comprising:
organizing said network into network cells having groups of said programmable industrial equipment;
providing a control handle for each unit of said programmable industrial equipment;
providing an operating unit to each said network cell;
sharing said operating unit among said programmable industrial equipment in each of said network cells;
connecting said operating unit to one unit of said programmable industrial equipment through said control handle;
controlling said one unit of said programmable industrial equipment through said connection; and
communicating with said network of programmable Industrial equipment through said connection.

28. The method according to claim 27 wherein said operating unit is specific to one of said network cells of programmable equipment, whereby each of said network cells of programmable equipment includes its own operating unit.

29. The method according to claim 27 wherein said step of connecting said operating unit is a wireless connection.

30. The method of claim 27 wherein said step of connecting said operating unit is a physical connection.

31. The method according to claim 27 further comprising the step of:
uniquely associating the shared operating unit with said unit of programmable equipment.

32. The method according to claim 27, wherein said step of uniquely associating said shared operating unit with said unit of programmable equipment includes providing said shared operating unit with tethered functions for control of said unit of programmable industrial equipment.

33. A method for operating a network of programmable industrial equipment comprising:
providing a control handle for each unit of said programmable industrial equipment;
sharing an operating unit among said programmable industrial equipment, said shared operating unit adapted to connect to a network; and
controlling one unit of said programmable industrial equipment through said operating unit by connecting said operating unit to said control handle associated with said unit of said programmable industrial equipment and indicating a unique association to said shared operating unit.

34. The method according to claim 33 further comprising:
communicating with any unit of said programmable industrial equipment by connecting said operating unit to said control handle associated with said one unit of said programmable industrial equipment.

35. The method of claim 33 further comprising said operating unit communicating with multiple units of programmable equipment through said network.

36. The method of claim 33 further comprising providing a unique association between said shared operating unit and said controller associated with said control handle.

37. The method of claim 36 further comprising communicating said unique association from said control handle to said shared operating unit.

38. A robot-control system, comprising:
multiple units of programmable industrial equipment, each unit of programmable industrial equipment including a programmable controller;
a control handle connected to each controller; and
a shared operating unit for controlling said unit of programmable industrial equipment through a unique association with said controller by selective connection to said control handle for said unit of programmable industrial equipment, said shared operating unit adapted to communicate with said each controller.

39. The system of claim 38 wherein said control handle provides an emergency stop function.

40. The system of claim 38 wherein said control handle provides manual control of said programmable industrial equipment.

41. The system of claim 40 wherein said manual motion control is provided by a jog button.

42. The system of claim 40 wherein said manual motion function is provided by a multiple degree of freedom motion control mechanism.

43. The system of claim 40 wherein said control handle includes an enable switch.

44. The system of claim 38 wherein said shared operating unit selectively provides tethered functions and non-tethered functions, said tethered functions only being available in conjunction with an emergency stop function.

45. The system of claim 44 wherein said tethered functions include manual motion control of said unit of programmable equipment connected to said control handle.

46. The system of claim 45 wherein said manual motion control is provided by a touch screen on said shared operating unit.

47. The system of claim 44 wherein said tethered functions include program start in a test mode.

48. The system of claim 44 wherein said tethered functions include program step in a test mode.

49. The system of claim 44 wherein said non-tethered functions include monitoring any said controller and any said unit of programmable equipment connected to the network.

50. The system of claim 38 wherein said shared operating unit selectively provides controller permission functions when permission is granted by said controller.

51. The system of claim 50 wherein said controller permission functions include programming said robot connected to said controller.

52. The system of claim 38 wherein said shared operating unit is physically connected to said control handle.

53. The system of claim 38 wherein said shared operating unit is wirelessly connected to said control handle.

54. The system of claim 38 wherein said shared operating unit is physically connected to the network.

55. The system of claim 38 wherein said shared operating unit is wirelessly connected to the network.

56. The system of claim 38 further comprising a cradle for supporting said control handle and said shared operating unit.

57. The system of claim 38 wherein said shared operating unit includes a touch screen, and further comprising a fingertip stylus for use with said touch screen.

58. The system of claim 38 wherein said control handle provides a unique association with said controller connected to said control handle.

59. The system of claim 38 wherein said control handle communicates to said shared operating unit said unique association.

60. The system of claim 38 wherein said shared operating unit is operable to communicate with multiple units of programmable equipment through a network.

* * * * *